April 11, 1967 K. C. MOSIER 3,313,317
FLUID VALVES

Filed March 10, 1964 2 Sheets-Sheet 1

INVENTOR
KENNETH C. MOSIER

BY *W. A. Morey*

ATTORNEY

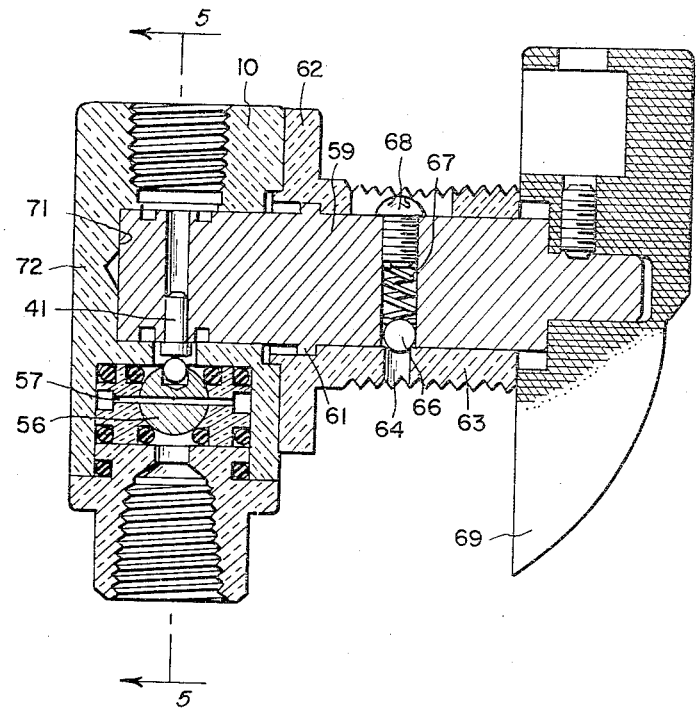
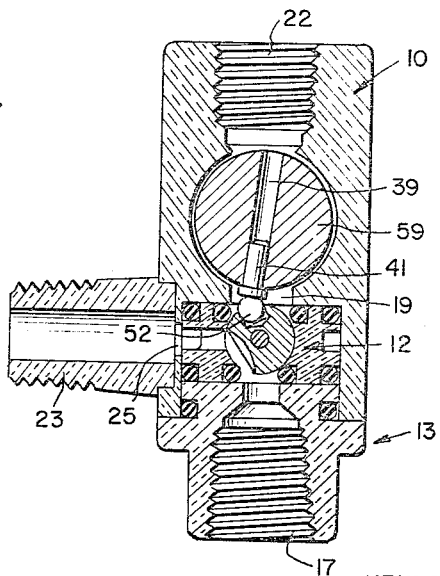

United States Patent Office 3,313,317
Patented Apr. 11, 1967

3,313,317
FLUID VALVES
Kenneth C. Mosier, 3516 Springdale Ave.,
Dayton, Ohio 45419
Filed Mar. 10, 1964, Ser. No. 350,722
6 Claims. (Cl. 137—625.46)

My invention has reference to fluid valves in general, and more specifically to improvements in valves of the type disclosed in my prior Patent No. 3,036,589, dated May 29, 1962.

As will be noted from my prior patent, I utilize as a valve element a truncated sphere or ball mounted on a pivot pin for rocking movement which is accomplished by engaging an operator, such as a solenoid plunger, with a metal pin secured to and projecting from the sphere. Although quite satisfactory from an operating standpoint, the cost of the pin and the labor required for its secure and accurate mounting is appreciable. Furthermore, the stroke of the solenoid plunger or operator is greater than is desired, since the cost of a solenoid increases rapidly as the stroke lengthens.

It is therefore a primary object of my invention to provide an improved fluid valve of the type utilizing an operating pin to rock a valve element about an axis wherein the cost of the operating pin and the labor of properly mounting the pin is reduced, and wherein the necessary stroke of the valve operator member is minimized with a corresponding reduction in cost.

The foregoing objectives as well as other important objects detailed description and from the appended drawings, in which:

FIGURE 4 is a vertical sectional view of a modified form of my valve; and

FIGURE 5 is a sectional view taken along the line 5—5 of FIGURE 4.

Figure 1:
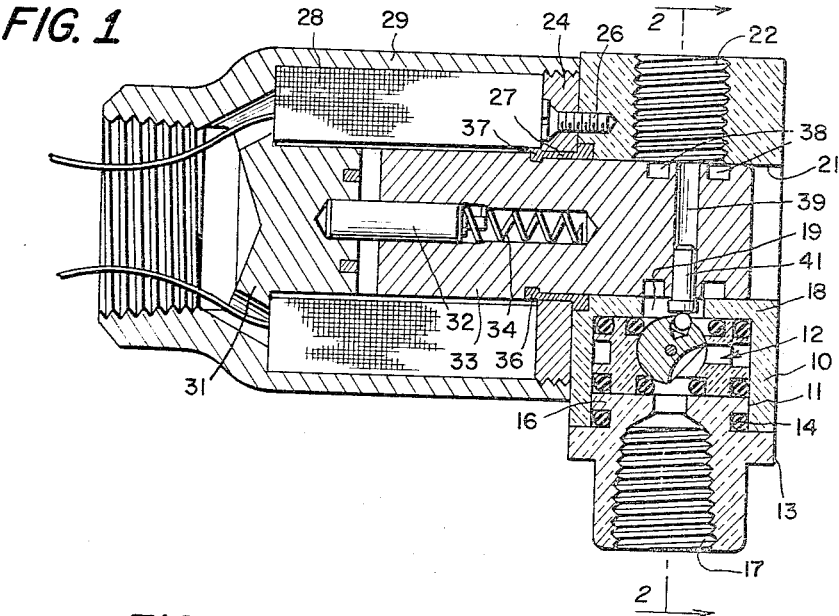
FIGURE 1 is a sectional view of my valve operated by a solenoid.

Referring to the drawings, my valve includes a valve body 10 having formed therein a cylindrical cartridge bore 11 open at its outer end to receive a cylindrical cartridge, generally designated 12, and concentric about the axis 2—2, as shown in FIGURE 1. A flange, generally designated 13, is sealed in the open end of the cartridge bore 11 by an O ring 14 disposed in a groove formed in a boss 16 projecting axially from the body of the flange 13. A threaded port opening 17 is formed axially in the flange 13, communicating at its inner end with the cartridge bore 11. Bolts 9, extending through suitable openings in the flange 13 and into the body 10, may be utilized to removably secure the flange 13 in position. A wall 18 integral with the body 10, extends across the inner extremity of the cartridge bore 11 and defines an aperture 19. An operator bore 21 extends through the body transversely to the axis 2—2 and intersects the aperture 19 thereby establishing communication between the cartridge and operator bores. A taped opening 22 is also formed in the body 10 on the axis 2—2 communicating with the operator bore 21 and constitutes an exhaust port for any valve.

Figure 2:
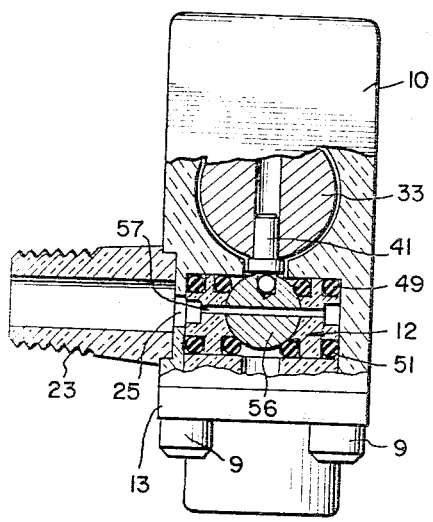
FIGURE 2 is a partial section taken along the line 2—2 of FIGURE 1.

As best shown in FIGURE 2, the body 10 is also drilled along an axis at 90° to the axis 2—2 and to the axis of the operator bore 21 forming a cylinder or intermediate port 25 which communicates with the cartridge bore 11 between the boss 16 and wall 18, as well as with suitable external connecting means, such as a nipple 23 sealed to the body 10.

A threaded iron ring 24 is secured to the body 10 by bolts 26 and is concentric with the axis of the operator bore 21. A flanged ring 27 of nonmagnetic metal, such as austenitic stainless steel, is secured between the ring 24 and the body 10 and extends along the inner face of the opening through the ring 24. A solenoid coil 28 is seated on the ring 24 and is held in position by a steel housing 29 having threaded engagement with the external edge of the ring 24. A plunger stop 31, formed integrally with the housing 29, extends across the axis of the solenoid opening 21 and is drilled to receive a plunger guide 32.

A cylindrical plunger 33 is disposed in the operator bore 21 and is provided with an axial opening permitting the plunger to telescope over the guide pin 32. A return spring 34 is also disposed in the opening in the plunger 33 between the plunger and the guide pin 32 in such a manner as to urge the plunger to the right as seen in FIGURE 1. A ring 36 of nonmagnetic metal, such as Phosphor-bronze, is snapped into a groove formed in the plunger in engagement with a shoulder 37 formed integrally with the plunger and prevents contact between the shoulder 37 and the ring 24. Thus, it will be noted that the plunger 33 is allowed to move axially in the bore 21 without contacting any portion of the iron circuit of the coil 28 which includes the housing 29 and the ring 24 except the plunger stop 31 which is contacted when the solenoid is energized. A pair of grooves 38 are formed in the outer surface of the plunger 33 near its outer end and serve to establish communication between the aperture 19 and the exhaust port 22.

Figure 3:
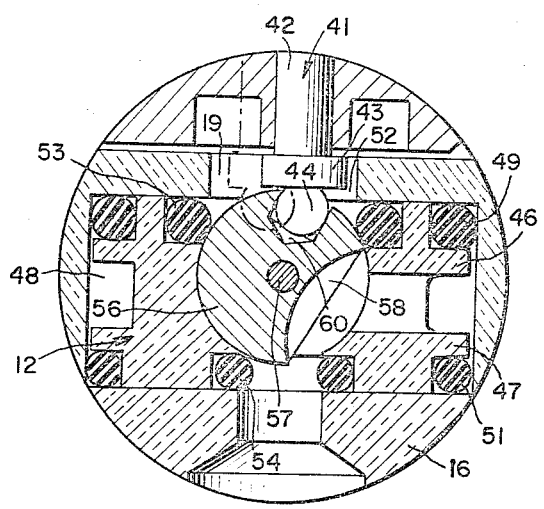
FIGURE 3 is an enlarged partial sectional view of the cartridge of my valve.

The plunger is also provided with a cylindrical opening 39 extending parallel to the axis 2—2 and between the grooves 38 to receive an operating pin, generally designated 41. As shown more clearly in FIGURE 3, the pin 41 has a cylindrical end portion 42 fitted into the cylindrical opening 39. Entry of the cylindrical end portion 42 of the pin 41 into opening 39 is limited by a collar 43 formed integrally with pin 41, and disposed in the aperture 19. The extremity of the pin 41 opposite the cylindrical portion 42 is formed as a sphere 44, this portion also being integral with the pin 41. Preferably, the pin 41 is formed of a synthetic resin having high strength, resistance to chemical attack and impact and good bearing qualities. It may also be formed of metal, if so desired.

The cartridge, generally designated 12, is provided with external parallel upper and lower flanges 46 and 47, respectively, spaced axially along the outer surface of the cartridge and defining a centrally disposed groove 48 which communicates with the cylinder port 25 when the cartridge is in position in the valve. Upper and lower outer O rings 49 and 51, respectively, are placed over the cartridge in contact with the upper and lower flanges 46 and 47 in such a manner as to bear against the body 10 when the cartridge is in position, thereby sealing these areas against the passage of fluid. A central bore 52 in the cartridge 12 is disposed axially along the axis 2—2 and is counterbored on the upper and lower faces of the cartridge, defining grooves in which upper and lower O rings 53 and 54, respectively, are disposed. The upper portion of the central bore 52 is cylindrical and terminates near its lower extremity in a spherical valve seat adapted to receive and support a ball valve 56. A pivot pin 57 extends through the cartridge 12 and through the ball 56 defining a pivot by which the ball may be rocked.

The ball 56 is truncated generally parallel to the pin 57, defining a face 58, and is also drilled to form a cylindrical opening 60 along an axis transverse to pivot pin 57 and of a diameter substantially equal to the diameter of the spherical end 44 of pin 41. The depth to which the truncated face 58 extends and its position relative to opening 60 is such that when the ball 56 are rocked clockwise, as seen in FIGURE 1, by movement of the plunger 33, communication will be established between the port 17 and the cylinder port 25. In this position, aperture 19 is sealed by engagement of O ring with the ball 56. Activation of the coil 28 draws the plunger 33 to the left as seen in FIGURE 1, causing the operating pin 41 to rock the ball 56 in a counterclockwise direction about the pivot pin 57. In this position communication is established between the cylinder port 25 and the exhaust port 22. The lower inner O ring 54 in this position seals the port 17 by engagement with the spherical surface of the ball 56. It will be apparent from the foregoing that the face 58 of the ball 56 need not necessarily be a flat surface and may if desired be concave, the latter being somewhat preferable due to its ability to form passages of greater cross sectional area in the valve.

From the foregoing, it will be apparent that the ball or sphere 56 must be driven by the plunger through a predetermined arcuate movement during operation. However, the distance the plunger 33, or operator element, must travel to accomplish this movement is largely controlled by the distance between the pivot pin 57 and the effective point of engagement with the plunger. In previous structures, this point of engagement has been disposed well within the solenoid plunger 33, whereas in the structure herein described the point of effective contact is actually within the confines of the sphere 56. Since the latter distance is much shorter, it is thus obvious that the necessary stroke of the plunger is substantially reduced.

The valve structure illustrated in FIGURES 4 and 5 is generally similar to that previously described, except that the operator element in this instance is rotatable about its major axis rather than being reciprocable along such an axis. More specifically, in lieu of the solenoid plunger 33, I provide an operator rod 59 having an external flange 61 journaled in a housing 62, secured by bolts (not shown) to the body 10. A threaded boss 63 on the housing 62 encloses the operator rod 59 and is drilled as at 64 to partially receive a detent ball 66, the latter being disposed in a corresponding drilled opening extending transversely through the operator rod 59. A spring 67 is interposed between the ball 66 and a bolt 68 engaging the opening in rod 59. A handle 69 or other means for rotating the rod 59 may be secured to the outer end of such rod.

As best shown in FIGURE 4, the body 10 in this instance defines an opening, indicated at 71, which receives the rod 59 and which terminates in a wall 72 integral with the body 10. The pin 41 is of similar design to that previously described and engages the ball or sphere 56 in similar manner, except that in this instance the axis of the pivot pin 57 is parallel rather than transverse to the major axis of the operator. The mode of operation of this form of valve is also substantially similar to that previously described except that the spherical end 52 of the pin 41 follows an arcuate path during operation rather than a straight or linear path.

From the foregoing, it will be apparent that I have provided a valve wherein the necessary movement of the operator element is substantially reduced when compared with structures previously utilized. As a result, the size and the cost of the solenoid required to drive the operator through its stroke may be substantially reduced. A further advantage of the reduced stroke is a reduction in the length of time required for actuation of the valve. Furthermore, the operating pin 41 is trapped in position by the operator and the ball valve by the collar on the pin so that even after considerable wear has occured the pin cannot move from its proper position. The collar on the pin operating within the aperture 19 is disposed in such manner as not only to guide the pin and operator, but also to limit movement of the operator member when necessary by engagement with the walls of the aperture 19. It has also been demonstrated that the advantages of my improved structure may be realized regardless whether the operator reciprocates or rotates during operation.

I claim:
1. In a valve of the type comprising a body having an inlet port, an exhaust port and an intermediate port, a cartridge sealed in the body having a transverse bore communicating with the intermediate port, and valve means comprising a spherical seat in the cartridge and a sphere diametrically pivotally mounted in said seat having a truncated face adapted on rocking of the sphere on its pivot axis to establish communication of said intermediate port alternatively with said inlet and exhaust ports and having a cylindrical opening normal to said pivot axis, an operating pin having an inner spherical end received in said cylindrical opening in the sphere and having an outer cylindrical end portion, and an operator element movably mounted on the valve body close to the sphere and having a cylindrical opening slidably receiving the outer end portion of the pin for reciprocation of its cylindrical portion therein, whereby a relatively small movement of the operator element produces relatively large angular movement of the truncated face of the sphere for establishing said alternative communications of the intermediate port.

2. The valve structure defined in claim 1 in which the operating pin includes a collar between the spherical end and the cylindrical end portion of said pin.

3. The structure defined in claim 1 wherein the operator element is reciprocably mounted.

4. The structure defined in claim 1 where the operator element is rotatably mounted.

5. The structure defined in claim 1 wherein the operator element is driven by a magnetic coil.

6. The structure of claim 1 wherein the cylindrical opening in the sphere has a depth greater than the radius of the spherical end of the operating pin.

References Cited by the Examiner
UNITED STATES PATENTS
3,036,589   5/1962   Mosier _____ 251—315 X M. CARY NELSON, *Primary Examiner.*

R. C. MILLER, *Assistant Examiners.*